(12) United States Patent
Christie

(10) Patent No.: US 6,757,771 B2
(45) Date of Patent: Jun. 29, 2004

(54) STACK SWITCHING MECHANISM IN A COMPUTER SYSTEM

(75) Inventor: David S. Christie, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 485 days.

(21) Appl. No.: 09/920,459

(22) Filed: Aug. 1, 2001

(65) Prior Publication Data

US 2002/0019902 A1 Feb. 14, 2002

Related U.S. Application Data

(60) Provisional application No. 60/224,368, filed on Aug. 9, 2000.

(51) Int. Cl.[7] ............................. G06F 9/00; G06F 12/08
(52) U.S. Cl. ...................................... 710/260; 711/132
(58) Field of Search ................................. 710/260, 263, 710/104; 711/5, 221, 208, 132; 707/100; 709/100, 300; 712/220, 228

(56) References Cited

U.S. PATENT DOCUMENTS

| 4,024,508 A | * | 5/1977 | Bachman et al. ............... 707/1 |
| 4,442,484 A | | 4/1984 | Childs, Jr. et al. |
| 5,303,378 A | * | 4/1994 | Cohen ......................... 710/264 |
| 5,379,392 A | * | 1/1995 | Alferness et al. ............... 711/5 |
| 5,414,821 A | * | 5/1995 | Nguyen et al. ............. 711/203 |
| 6,003,038 A | * | 12/1999 | Chen ....................... 707/103 R |
| 6,321,275 B1 | * | 11/2001 | McQuistan et al. ......... 719/330 |

OTHER PUBLICATIONS

"Pentium™ Processor User's Manual, vol. 3: Architecture and Programming," Chapters 11–14, Intel Corporation, 1994.

* cited by examiner

*Primary Examiner*—Gopal C. Ray
(74) *Attorney, Agent, or Firm*—Meyertons Hood Kivlin Kowert & Goetzel, P.C.; Rory D. Rankin

(57) ABSTRACT

A method and mechanism for performing an unconditional stack switch in a processor. A processor includes a processing unit coupled to a memory. The memory includes a plurality of stacks, a special mode task state segment, and a descriptor table. The processor detects interrupts and accesses a descriptor corresponding to the interrupt within the descriptor table. Subsequent to accessing the descriptor, the processor is configured to access an index within the descriptor in order to determine whether or not an interrupt stack table mechanism is enabled. In response to detecting the interrupt stack table mechanism is enabled, the index is used to select an entry in the interrupt stack table. The selected entry in the interrupt stack table indicates a stack pointer which is then used to perform an unconditional stack switch.

24 Claims, 7 Drawing Sheets

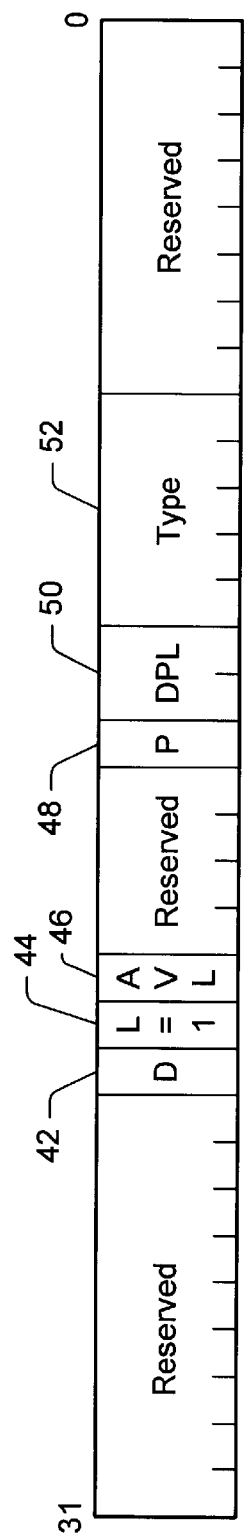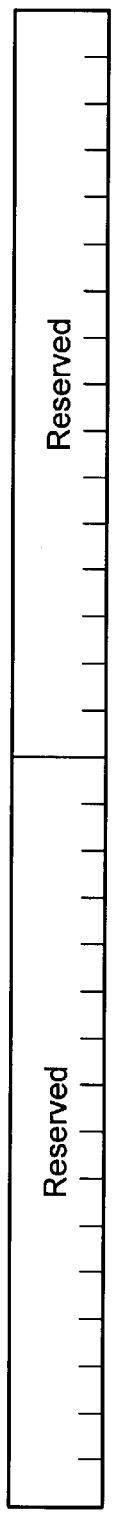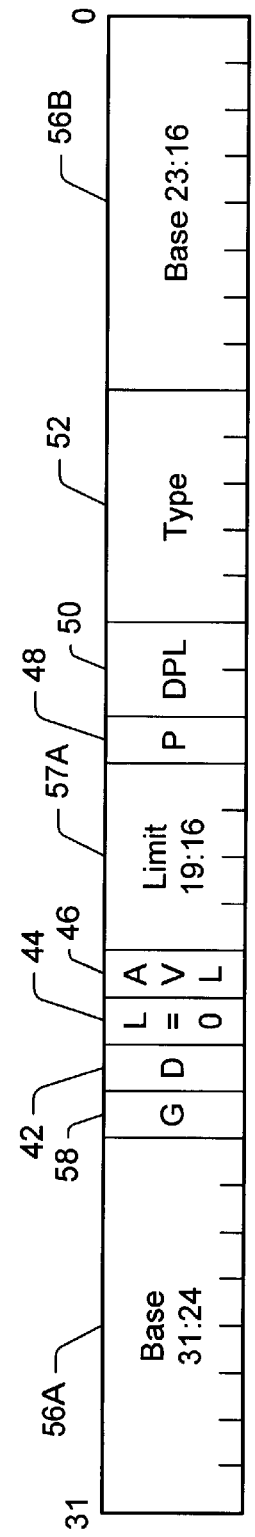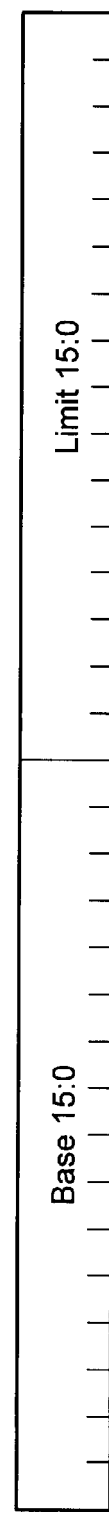
Fig. 2
Fig. 3

| LME | CS L Bit | CS D Bit | Operating Mode |
|---|---|---|---|
| 0 | x | 0 | 16 Bit Mode |
| 0 | x | 1 | 32 Bit Mode |
| 1 | 0 | 0 | 16 Bit Compatibility Mode |
| 1 | 0 | 1 | 32 Bit Compatibility Mode |
| 1 | 1 | 0 | 32/64 Mode |
| 1 | 1 | 1 | Reserved |

STACK SWITCHING MECHANISM IN A COMPUTER SYSTEM

CROSS REFERENCE TO RELATED APPLICATIONS

This application claims benefit of priority to Provisional Application Ser. No. 60/224,368 filed Aug. 9, 2000.

BACKGROUND OF THE INVENTION

1. Field of the Invention

This invention is related to the field of processors and, more particularly, to the handling of interrupts.

2. Description of the Related Art

The x86 architecture (also known as the IA-32 architecture) has enjoyed widespread acceptance and success in the marketplace. Accordingly, it is advantageous to design processors according to the x86 architecture. Such processors may benefit from the large body of software written to the x86 architecture (since such processors may execute the software and thus computer systems employing the processors may enjoy increased acceptance in the market due to the large amount of available software).

As computer systems have continued to evolve, 64 bit address size (and sometimes operand size) has become desirable. A larger address size allows for programs having a larger memory footprint (the amount of memory occupied by the instructions in the program and the data operated upon by the program) to operate within the memory space. A larger operand size allows for operating upon larger operands, or for more precision in operands. More powerful applications and/or operating systems may be possible using 64 bit address and/or operand sizes.

Unfortunately, the x86 architecture is limited to a maximum 32 bit operand size and 32 bit address size. The operand size refers to the number of bits operated upon by the processor (e.g. the number of bits in a source or destination operand). The address size refers to the number of bits in an address generated by the processor. Thus, processors employing the x86 architecture may not serve the needs of applications which may benefit from 64 bit address or operand sizes.

In addition, there are various operating system (OS) support features of the x86 architecture which are not widely used in practice, but which may complicate the design and verification of a given implementation or the addition of useful architectural extensions. One example of this is the built-in task switching support, whereby a single control transfer instruction may automatically cause the entire register state of the running program (commonly called the context) to be stored to a system data structure known as the Task State Segment (TSS), and the context of a different program to be loaded from a second TSS, including the Instruction Pointer at which to start execution. This task switching operation may also be initiated by an exception, software interrupt, or external hardware interrupt.

Although the intent of this task switching feature was to automate a large part of the common OS procedure of switching between programs, it eliminates flexibility that OS writers typically prefer, and which they can gain by writing their own context-switching sequences using basic instructions. Hence, most all mainstream x86 operating systems typically use their own sequences to handle context switching, along with their own software data structures rather than the TSS.

There is however one aspect of the TSS which is still used in many systems to support exceptions and interrupts, and which is required by architectural definition. When an exception or interrupt occurs, the processor responds with a control transfer to a special code sequence intended to deal with such an event. The special code sequence typically runs in supervisor mode. The address of this special code sequence, or routine, is retrieved by the processor from an Interrupt Descriptor Table (IDT), using an index (the exception vector) into the IDT that is specific to the type of exception that occurred (e.g. one exception vector may correspond to a page fault while another corresponds to an overflow exception). Before loading the address of the routine into the Instruction Pointer (EIP) register to complete the control transfer, the original EIP value is saved for later inspection or resumption of the interrupted sequence by pushing it onto the stack. For a user-mode exception/interrupt the original stack pointer (ESP) must also be saved and loaded with a new value pointing to the exception handler's stack, since the x86 architecture requires separate stacks for different privilege levels. This new stack is where the original EIP and ESP values are saved. The pointer to this new stack is retrieved from a location in the TSS structure, and the original instruction pointer (EIP) and stack pointer (ESP) are saved on that new stack. Hence even if the built-in task switching is not used, a TSS must be set up simply to hold this stack pointer. Typically, since there is only one instance of the supervisor program, there need be only one instance of the supervisor stack, and hence only one such TSS is needed.

Although this mechanism suffices for handling routine application exceptions such as page faults or numerical errors, there are at least two cases where this is not sufficient. When a processor is running in supervisor mode it can be susceptible to the same exceptions and interrupts as a user-mode application. In this case, since it is already in supervisor mode and no change in privilege level is required, the stack pointer does not need to be switched and the exception information is just written to the stack indicated by the current stack pointer. But for certain types of faults this can lead to a situation where no forward progress can be made. For example, if the current stack pointer became corrupted and pointed to a virtual page which was not mapped to physical memory, a reference to the top of the stack would cause a page fault exception. In response to this page fault exception, the processor would try to write the exception information to the stack indicated by the stack pointer, incurring another page fault exception known architecturally as a Double Fault. A Double Fault is itself a distinct exception condition with an associated interrupt vector. If, in response to the Double Fault, the processor again attempts to write to the stack, it will again incur the Page Fault exception. This situation is known as a Triple Fault, and a this point the processor halts and enters Shutdown state.

In order to properly handle this situation, a Task Gate descriptor must be used in the IDT for the Double Fault exception vector, instead of a Trap or Interrupt Gate. This causes the processor to do a complete task switch using the built-in task switching feature, regardless of privilege level, which establishes a known good stack. In this situation, most of the exception state is available in the TSS, but any error code associated with the exception will be pushed on the new stack.

However, because the above task switching support mechanism of the x86 architecture is not widely used in mainstream operating systems and its full implementation may complicate the design and verification of useful architectural extensions, and because certain features of the TSS are required by the architecture, a new mechanism is desired which ensures a known good stack.

SUMMARY OF THE INVENTION

The problems outlined above are in large part solved by a method and mechanism as described herein.

Broadly speaking, a processor configured to perform an unconditional stack switch and ensure a good stack pointer is contemplated. The processor includes a processing unit coupled to a memory. The memory comprises a plurality of stacks, a data structure, and a descriptor table. The processor is configured to detect interrupts and access a descriptor corresponding to the interrupt within the descriptor table. The descriptor table includes a number of descriptors, each of which includes an index corresponding to entries in an interrupt stack table within the data structure. Subsequent to accessing the descriptor, the processor is configured to access the index within the descriptor in order to determine whether or not an interrupt stack table mechanism is enabled. In response to detecting the interrupt stack table is enabled, the index is used to select an entry in the interrupt stack table. The selected entry in the interrupt stack table indicates a stack pointer which is then used to perform a stack switch.

In one embodiment, the processor is configured to operate in either a legacy mode or a long mode. When operating in a legacy mode, the processor is configured to utilize an existing stack switch mechanism. However, when operating in a long mode, the processor is configured to have access to the interrupt stack switch mechanism.

BRIEF DESCRIPTION OF THE DRAWINGS

Other objects and advantages of the invention will become apparent upon reading the following detailed description and upon reference to the accompanying drawings in which:

FIG. 2 is a block diagram of one embodiment of a segment descriptor for 32/64 mode.

FIG. 3 is a block diagram of one embodiment of a segment descriptor for compatibility mode.

Figure 1:
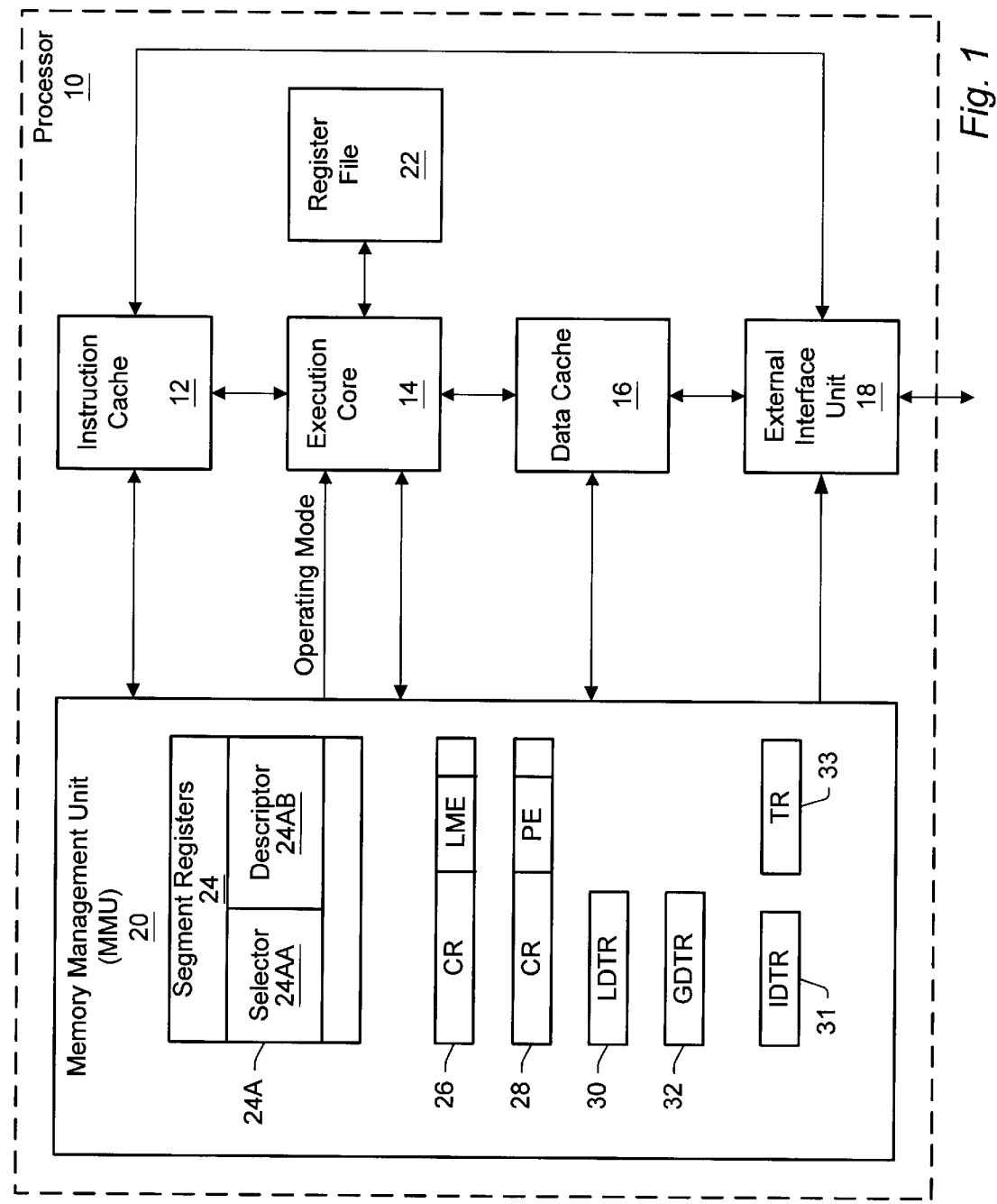
FIG. 1 is a block diagram of one embodiment of a processor.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

Turning now to FIG. 1, a block diagram illustrating one embodiment of a processor 10 is shown. Other embodiments are possible and contemplated. In the embodiment of FIG. 1, processor 10 includes an instruction cache 12, an execution core 14, a data cache 16, an external interface unit 18, a memory management unit (MMU) 20, and a register file 22. In the illustrated embodiment, MMU 20 includes a set of segment registers 24, a first control register 26, a second control register 28, a local descriptor table register (LDTR) 30, an interrupt descriptor table register (IDTR) 31, a global descriptor table register (GDTR) 32, and a task register (TR) 33. Instruction cache 12 is coupled to external interface unit 18, execution core 14, and MMU 20. Execution core 14 is further coupled to MMU 20, register file 22, and data cache 16. Data cache 16 is further coupled to MMU 20 and external interface unit 18. External interface unit 18 is further coupled to MMU 20 and to an external interface.

Generally speaking, processor 10 employs a processor architecture compatible with the x86 architecture and including additional architectural features to support 64 bit processing. Processor 10 is configured to establish an operating mode in response to information stored in a code segment descriptor corresponding to the currently executing code and in further response to one or more enable indications stored in one or more control registers. As used herein, an "operating mode" specifies default values for various programmably selectable processor attributes. For example, the operating mode may specify a default operand size and a default address size. The default operand size specifies the number of bits in an operand of an instruction, unless an instruction's encoding overrides the default. The default address size specifies the number of bits in an address of a memory operand of an instruction, unless an instruction's encoding overrides the default. The default address size specifies the size of at least the virtual address of memory operands, and may also specify the size of the physical address. Alternatively, the size of the physical address may be independent of the default address size and may instead be dependent on the Long Mode Enable (LME) bit described below (e.g. the physical address may be 32 bits if the LME bit is clear and an implementation-dependent size greater than 32 bits and less than 64 bits if the LME bit is set) or on another control bit (e.g. the physical address extension (PAE) bit in another control register). As used herein, a "virtual address" is an address generated prior to translation through an address translation mechanism (e.g. a paging mechanism) to a "physical address", which is the address actually used to access a memory. Additionally, as used herein, a "segment descriptor" is a data structure created by software and used by the processor to define access control and status for a segment of memory. A "segment descriptor table" is a table in memory having multiple entries, each entry capable of storing a segment descriptor.

In the illustrated embodiment, MMU 20 generates an operating mode and conveys the operating mode to execution core 14. Execution core 14 executes instructions using the operating mode. More particularly, execution core 14 fetches operands having the default operand size from register file 22 or memory (through data cache 16, if the memory operands are cacheable and hit therein, or through external interface unit 18 if the memory operands are noncacheable or miss data cache 16) unless a particular instruction's encoding overrides the default operand size, in which case the overriding operand size is used. Similarly, execution core 14 generates addresses of memory operands, wherein the addresses have the default address size unless a particular instruction's encoding overrides the default address size, in which case the overriding address size is used. In other embodiments, the information used to generate the operating mode may be shadowed locally in the portions of processor 10 which use the operating mode (e.g. execution core 14), and the operating mode may be determined from the local shadow copies.

As mentioned above, MMU 20 generates the operating mode responsive to a code segment descriptor corresponding to the code being executed and further responsive to one or more values in control registers. Information from the code segment descriptor is stored in one of the segment registers 24 (a register referred to as CS, or code segment). Additionally, control register 26 stores an enable indication (LME) which is used to enable an operating mode in which the default address size is greater than 32 bits ("32/64 mode") as well as certain compatibility modes for the 32 bit and 16 bit operating modes. The default operand size may be 32 bits in 32/64 mode, but instructions may override the default 32 bit operand size with a 64 bit operand size when desired. If the LME indication is in an enabled state, then 32/64 mode may be used in addition to 32 bit and 16 bit modes. If the LME indication is in a disabled state, then 32/64 mode is disabled. In one embodiment, the default address size in 32/64 mode may be implementation-dependent but may be any value up to and including 64 bits. Furthermore, the size of the virtual address may differ in a given implementation from the size of the physical address in that implementation.

It is noted that enable indications may be described herein as bits with the enabled state being the set state of the bit and the disabled state being the cleared state of the bit. However, other encodings are possible, including encodings in which multiple bits are used and encodings in which the enabled state is the clear state and the disabled state is the set state. Accordingly, the remainder of this description may refer to the LME indication in control register 26 as the LME bit, with the enabled state being set and the disabled state being clear. However, other encodings of the LME indication are contemplated, as set forth above.

Segment registers 24 store information from the segment descriptors currently being used by the code being executed by processor 10. As mentioned above, CS is one of segment registers 24 and specifies the code segment of memory. The code segment stores the code being executed. Other segment registers may define various data segments (e.g. a stack data segment defined by the SS segment register, and up to four data segments defined by the DS, ES, FS, and GS segment registers). FIG. 1 illustrates the contents of an exemplary segment register 24A, including a selector field 24AA and a descriptor field 24AB. Selector field 24AA is loaded with a segment selector to activate a particular segment in response to certain segment load instructions executed by execution core 14. The segment selector identifies the segment descriptor in a segment descriptor table in memory. More particularly, processor 10 may employ two segment descriptor tables: a local descriptor table and a global descriptor table. The base address of the local descriptor table is stored in the LDTR 30. Similarly, the base address of the global descriptor table is stored in GDTR 32. A bit within the segment selector (the table indicator bit) selects the descriptor table, and the remainder of the segment selector is used as an index into the selected table. When an instruction loads a segment selector into one of segment registers 24, MMU 20 reads the corresponding segment descriptor from the selected segment descriptor table and stores information from the segment descriptor into the segment descriptor field (e.g. segment descriptor field 24AB for segment register 24A). The information stored in the segment descriptor field may comprise any suitable subset of the segment descriptor, including all of the segment descriptor, if desired. Additionally, other information derived from the segment descriptor or other sources may be stored in the segment descriptor field, if desired. For example, an embodiment may decode the operating mode indications from the code segment descriptor and store the decoded value rather than the original values of the operating mode indications. If an instruction causes CS to be loaded with a segment selector, the code segment may change and thus the operating mode of processor 10 may change. Segment descriptor tables are described in more detail below.

In one embodiment, only the CS segment register is used in 32/64 mode. The data segment registers are ignored. In 16 and 32 bit modes, the code segment and data segments may be active. Furthermore, a second enable indication (PE) in control register 28 may affect the operation of MMU 20. The PE enable indication may be used to enable protected mode, in which segmentation and/or paging address translation mechanisms may be used. If the PE enable indication is in the disabled state, segmentation and paging mechanisms are disabled and processor 10 is in "real mode" (in which addresses generated by execution core 14 are physical addresses). Similar to the LME indication, the PE indication may be a bit in which the enabled state is the bit being set and the disabled state is the bit being clear. However, other embodiments are contemplated as described above.

In addition to local descriptor tables and global descriptor tables, another data structure, called an Interrupt Descriptor Table (IDT), is used for handling interrupts. A pointer to the IDT is maintained in the Interrupt Descriptor Table Register (IDTR) 31. Another data structure which is utilized in the handling of interrupts is the Task State Segment (TSS). The TSS includes information required for performing task switches, such as stack pointers and an I/O map base address. Each task may have its own TSS. Task Register 33 contains a pointer to the TSS corresponding to the current task. Interrupt handling is discussed further below.

It is noted that MMU 20 may employ additional hardware mechanisms, as desired. For example, MMU 20 may include paging hardware to implement paging address translation from virtual addresses to physical addresses. The paging hardware may include a translation lookaside buffer (TLB) to store page translations.

It is noted that control registers 26 and 28 may be implemented as architected control registers (e.g. control register 26 may be CR4 and control register 28 may be CR0). Alternatively, one or both of the control registers may be implemented as model specific registers to allow for other uses of the architected control registers without interfering with 32/64 mode.

Generally, instruction cache 12 is a high speed cache memory for storing instruction bytes. Execution core 14 fetches instructions from instruction cache 12 for execution. Instruction cache 12 may employ any suitable cache organization, including direct-mapped, set associative, and fully associative configurations. If an instruction fetch misses in instruction cache 12, instruction cache 12 may communicate with external interface unit 18 to fill the missing cache line into instruction cache 12. Additionally, instruction cache 12 may communicate with MMU 20 to receive physical address translations for virtual addresses fetched from instruction cache 12.

Execution core 14 executes the instructions fetched from instruction cache 12. Execution core 14 fetches register operands from register file 22 and updates destination registers in register file 22. The size of the register operands is controlled by the operating mode and any overrides of the operating mode for a particular instruction. Similarly, execution core 14 fetches memory operands from data cache 16 and updates destination memory locations in data cache 16, subject to the cacheability of the memory operands and hitting in data cache 16. The size of the memory operands is similarly controlled by the operating mode and any overrides of the operating mode for a particular instruction. Furthermore, the size of the addresses of the memory operands generated by execution core 14 is controlled by the operating mode and any overrides of the operating mode for a particular instruction.

Execution core 14 may employ any suitable construction. For example, execution core 14 may be a superpipelined core, a superscalar core, or a combination thereof. Execution core 14 may employ out of order speculative execution or in order execution, according to design choice.

Register file 22 may include 64 bit registers which may be accessed as 64 bit, 32 bit, 16 bit, or 8 bit registers as indicated by the operating mode of processor 10 and any overrides for a particular instruction. The registers included in register file 22 may include the RAX, RBX, RCX, RDX, RDI, RSI, RSP, and RBP registers (which may be 64 bit versions of the EAX, EBX, ECX, EDX, EDI, ESI, ESP, and EBP registers defined in the x86 processor architecture, respectively). Register file 22 may further include the RIP register which may be a 64 bit version of the EIP register. Alternatively, execution core 14 may employ a form of register renaming in which any register within register file 22 may be mapped to an architected register. The number of registers in register file 22 may be implementation dependent for such an embodiment.

Data cache 16 is a high speed cache memory configured to store data. Data cache 16 may employ any suitable cache organization, including direct-mapped, set associative, and fully associative configurations. If a data fetch or update misses in data cache 16, data cache 16 may communicate with external interface unit 18 to fill the missing cache line into data cache 16. Additionally, if data cache 16 employs a writeback caching policy, updated cache lines which are being cast out of data cache 16 may be communicated to external interface unit 18 to be written back to memory. Data cache 16 may communicate with MMU 20 to receive physical address translations for virtual addresses presented to data cache 16.

External interface unit 18 communicates with portions of the system external to processor 10. External interface unit 18 may communicate cache lines for instruction cache 12 and data cache 16 as described above, and may communicate with MMU 20 as well. For example, external interface unit 18 may access the segment descriptor tables and/or paging tables on behalf of MMU 20.

It is noted that processor 10 may include an integrated level 2 (L2) cache, if desired. Furthermore, external interface unit 18 may be configured to communicate with a backside cache in addition to communicating with the system.

Turning now to FIG. 2, a block diagram of one embodiment of a code segment descriptor 40 for 32/64 mode is shown. Other embodiments are possible and contemplated. In the embodiment of FIG. 2, code segment descriptor 40 comprises 8 bytes with the most significant 4 bytes illustrated above the least significant 4 bytes. The most significant four bytes are stored at a numerically larger address than the least significant four bytes. The most significant bit of each group of four bytes is illustrated as bit 31 in FIG. 2 (and FIG. 3 below), and the least significant bit is illustrated as bit 0. Short vertical lines within the four bytes delimit each bit, and the long vertical lines delimit a bit but also delimit a field (both in FIG. 2 and in FIG. 3).

Unlike the 32 bit and 16 bit code segment descriptors illustrated in FIG. 3 below, code segment descriptor 40 does not include a base address or limit. Processor 10 employs a flat virtual address space for 32/64 mode (rather than the segmented linear address space employed in 32 bit and 16 bit modes). Accordingly, the portions of code segment descriptor 40 which would otherwise store the base address and limit are reserved in segment descriptor 40. It is noted that a virtual address provided through segmentation may also be referred to herein as a "linear address". The term "virtual address" encompasses any address which is translated through a translation mechanism to a physical address actually used to address memory, including linear addresses and other virtual addresses generated in non-segmented architectures.

Figure 5:
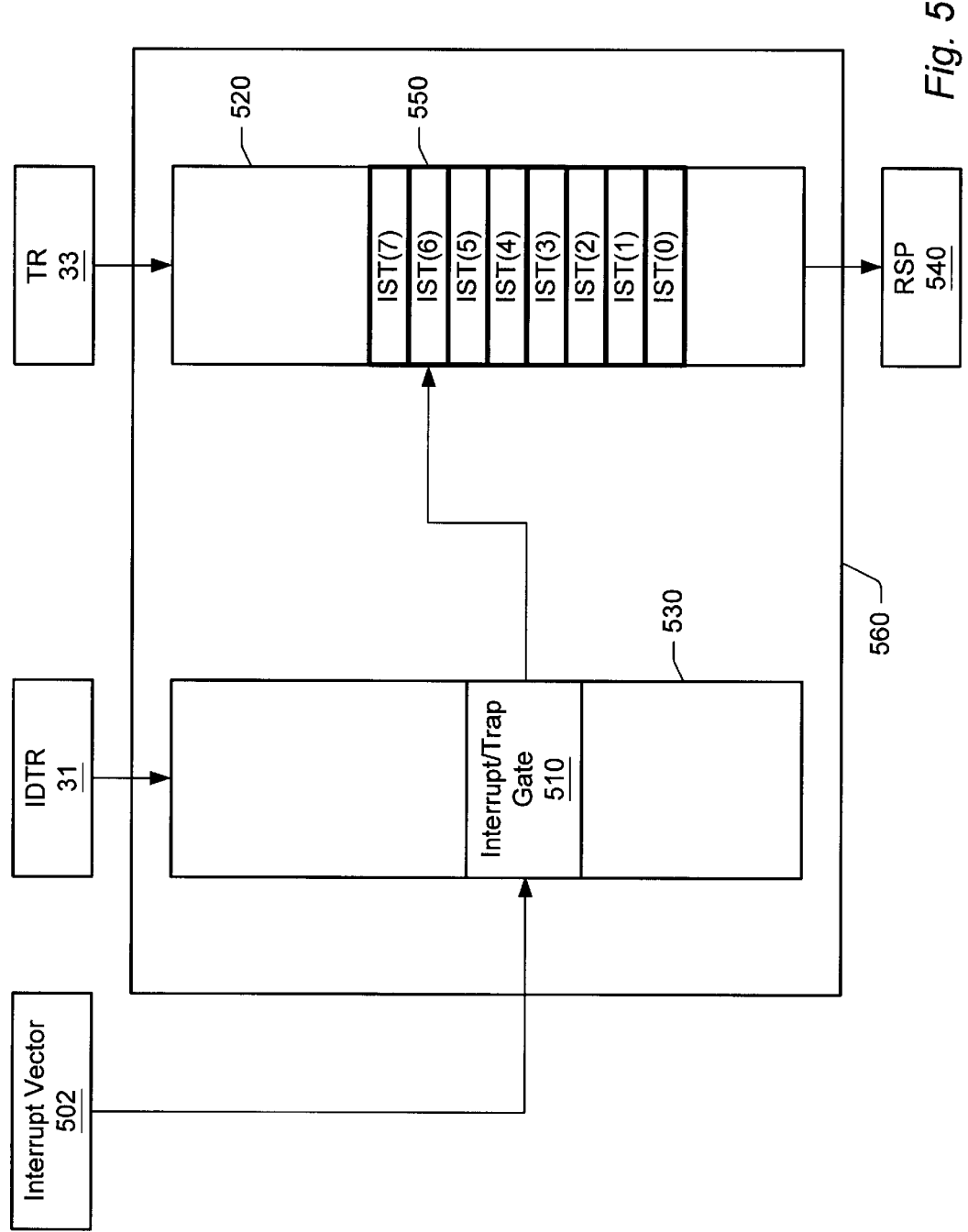
FIG. 5 is a diagram illustrating an Interrupt Stack Table Mechanism.

Segment descriptor 40 includes a D bit 42, an L bit 44 (set to one for a 32/64 mode code segment), an available bit (AVL) 46, a present (P) bit 48, a descriptor privilege level (DPL) 50, and a type field 52. D bit 42 and L bit 44 are used to determine the operating mode of processor 10, as illustrated in FIG. 5 below. AVL bit 46 is available for use by system software (e.g. the operating system). P bit 48 is used to indicate whether or not the segment is present in memory. If P bit 48 is set, the segment is present and code may be fetched from the segment. If P bit 48 is clear, the segment is not present and an exception is generated to load the segment into memory (e.g. from disk storage or through a network connection). The DPL indicates the privilege level of the segment. Processor 10 employs four privilege levels (encoded as 0 through 3 in the DPL field, with level 0 being the most privileged level). Certain instructions and processor resources (e.g. configuration and control registers) are only executable or accessible at the more privileged levels, and attempts to execute these instructions or access these resources at the lower privilege levels result in an exception. When information from code segment 40 is loaded into the CS segment register, the DPL becomes the current privilege level (CPL) of processor 10. Type field 52 encodes the type of segment. For code segments, the most significant bit two bits of type field 52 may be set (the most significant bit distinguishing a code or data segment from a system segment, and the second most significant bit distinguishing a code segment from a data segment), and the remaining bits may encode additional segment type information (e.g. execute only, execute and read, or execute and read only, conforming, and whether or not the code segment has been accessed).

It is noted that, while several indications in the code segment descriptor are described as bits, with set and clear values having defined meanings, other embodiments may employ the opposite encodings and may use multiple bits, as desired. Thus, for example, the D bit 42 and the L bit 44 may each be an example of an operating mode indication which may be one or more bits as desired, similar to the discussion of enable indications above.

Turning now to FIG. 3, a block diagram of one embodiment of a code segment descriptor 54 for 32 and 16 bit compatibility mode is shown. Other embodiments are possible and contemplated. As with the embodiment of FIG. 2, code segment descriptor 54 comprises 8 bytes with the most significant 4 bytes illustrated above the least significant 4 bytes.

Code segment descriptor 54 includes D bit 42, L bit 44, AVL bit 46, P bit 48, DPL 50, and type field 52 similar to the above description of code segment descriptor 40. Additionally, code segment descriptor 54 includes a base address field (reference numerals 56A, 56B, and 56C), a limit field (reference numerals 57A and 57B) and a G bit 58. The base address field stores a base address which is added to the logical fetch address (stored in the RIP register) to form the linear address of an instruction, which may then optionally be translated to a physical address through a paging translation mechanism. The limit field stores a segment limit which defines the size of the segment. Attempts to access a byte at a logical address greater than the segment limit are disallowed and cause an exception. G bit 58 determines the scaling of the segment limit field. If G bit 58 is set the limit is scaled to 4K byte pages (e.g. 12 least significant zeros are appended to the limit in the limit field). If G bit 58 is clear, the limit is used as is.

It is noted that code segment descriptors for 32 and 16 bit modes when 32/64 mode is not enabled via the LME bit in control register 26 may be similar to code segment descriptor 54, except the L bit is reserved and defined to be zero. It is further noted that, in 32 and 16 bit modes (both compatibility mode with the LMF bit set and modes with the LME bit clear) according to one embodiment, data segments are used as well. Data segment descriptors may be similar to code segment descriptor 54, except that the D bit 42 is defined to indicate the upper bound of the segment or to define the default stack size (for stack segments).

Figure 4:
FIG. 4 is a table illustrating one embodiment of operating modes as a function of segment descriptor and control register values.

Turning next to FIG. 4, a table 70 is shown illustrating the states of the LME bit, the L bit in the code segment descriptor, and the D bit in the code segment descriptor and the corresponding operating mode of processor 10 according to one embodiment of processor 10. Other embodiments are possible and contemplated. As table 70 illustrates, is if the LME bit is clear, then the L bit is reserved (and defined to be zero). However, processor 10 may treat the L bit as a don't care if the LME bit is clear. Thus, the x86 compatible 16 bit and 32 bit modes may be provided by processor 10 if the LME bit is clear. If the LME bit is set and the L bit in the code segment is clear, then a compatibility operating mode is established by processor 10 and the D bit selects 16 bit or 32 bit mode. If the LME bit and the L bit are set and the D bit is clear, 32/64 mode is selected for processor 10. Finally, the mode which would be selected if the LME, L and D bits are all set is reserved.

As mentioned above, the 32/64 operating mode includes a default address size in excess of 32 bits (implementation dependent but up to 64 bits) and a default operand size of 32 bits. The default operand size of 32 bits may be overridden to 64 bits via a particular instruction's encoding. The default operand size of 32 bits is selected to minimize average instruction length (since overriding to 64 bits involves including an instruction prefix in the instruction encoding which may increase the instruction length) for programs in which 32 bits are sufficient for many of the data manipulations performed by the program. For such programs (which may be a substantial number of the programs currently in existence), moving to a 64 bit operand size may actually reduce the execution performance achieved by the program (i.e. increased execution time). In part, this reduction may be attributable to the doubling in size in memory of the data structures used by the program when 64 bit values are stored. If 32 bits is sufficient, these data structures would store 32 bit values, Thus, the number of bytes accessed when the data structure is accessed increases if 64 bit values are used where 32 bit values would be sufficient, and the increased memory bandwidth (and increased cache space occupied by each value) may cause increased execution time. Accordingly, 32 bits is selected as the default operand size and the default may be overridden via the encoding of a particular instruction.

Task Switching and Long Mode

As mentioned above, the x86 architecture includes a well known built-in task switching support mechanism, whereby a single control transfer instruction may automatically cause the entire register state of the running program (commonly called the context) to be stored to a system data structure known as the Task State Segment (TSS), and the context of a different program to be loaded from a second TSS, including the Instruction Pointer at which to start execution. This task switching operation may also be initiated by an exception, software interrupt, or external hardware interrupt.

As described above, certain conditions such as a "Double Fault" may lead to the processor halting. Such problems may be the result of a corrupted or otherwise invalid stack pointer when attempting to respond to an interrupt, and may be handled through the use of the TSS stack switching mechanism of the x86 architecture. However, because the above task switching support mechanism of the x86 architecture is not widely used in mainstream operating systems and its full implementation may complicate the design and verification of useful architectural extensions, and because certain features of the TSS are required by the architecture, a new mechanism for ensuring a pointer to a good stack is desired. While reference is made to interrupts in the following discussion, other forms of control transfer, such as exceptions, faults, and traps, etc. are contemplated as well.

In one embodiment, when processor 10 is configured to operate in 16 bit mode or 32 bit mode, as shown in table 70, the well known ("legacy") x86 TSS stack switching mechanism may be employed. Legacy-mode stack pointers consist of an SS:ESP pair (16-bit selector and a 16-bit or 32-bit offset). The operating system creates stack pointers for privilege levels 0, 1 and 2 and stores them in the current TSS. In legacy mode, when responding to an interrupt where the associated IDT entry is an Interrupt or Trap Gate descriptor that causes a change in privilege level, the processor automatically performs a stack switch from the current stack to the inner-level stack defined for the new privilege level. A new SS:ESP pair is loaded from the TSS and the stack switch is initiated. After completing the stack switch, the processor pushes the old SS:ESP pair onto the new stack so that the subsequent IRET (return from interrupt) instruction restores the old stack. Also, when responding to an interrupt where the associated IDT entry is a Task Gate descriptor, the processor automatically switches stacks as the entire register context is written out to the current TSS and the new register context, including SS and ESP values, is loaded from the target TSS. However, as discussed above, when operating in other modes as indicated by table 70 (i.e., compatibility modes or 32/64 mode, hereinafter referred to as "long mode") which may involve architectural extensions, it may not be desirable or appropriate to fully support the legacy TSS task switching mechanism. Consequently, an alternative stack switching mechanism which unconditionally switches stacks is described below.

In one embodiment, the legacy x86 task switching architecture may not be supported when operating in long mode. Consequently, when operating in long mode, task management and switching may be performed by software (though any suitable combination of hardware and/or software may be employed). While the legacy hardware task switching mechanism may not be supported in long mode, a 64-bit TSS may still be supported. The 64-bit TSS may include information for use in long mode such as stack pointers (RSPs) and, in particular, a table of several stack pointers. In one embodiment, the operating system creates at least one 64-bit TSS after activating long mode, and executes an LTR (load task register) instruction in 64-bit mode to load the TR register with a pointer to the 64-bit TSS.

Interrupt Stack Table

FIG. 5 is a diagram illustrating one embodiment of an alternative stack switching mechanism utilizing an Interrupt Stack Table (IST). Included in FIG. 5 are an interrupt vector 502, IDTR 31, TR 33, a memory 560, Interrupt Descriptor Table (IDT) 530, Interrupt/Trap Gate 510, Task State Segment 520, Interrupt Stack Table 550 containing 8 entries, and Stack Pointer register RSP 540. Generally speaking, when an interrupt is detected, the processor 10 obtains an interrupt vector 502 which is used as an index into the IDT 530 identified by the IDTR 31. The IDT 530 typically includes a number of interrupt/trap gates, each of which correspond to different types of interrupts and include information related to the handling of that interrupt.

In one embodiment, the index into the IDT 530 is formed by scaling the interrupt vector by 16. In FIG. 5, interrupt vector 502 indexes into IDT 530 and selects interrupt/trap gate 510. Interrupt/trap gate 510 includes an IST field which indicates whether or not an IST mechanism is to be used. If the IST field indicates the IST mechanism is not to be used, then the IST mechanism is not used. However, if the IST field indicates the IST mechanism is to be used, the IST field forms an index which is used to locate an entry in the current IST 550. The IST 550 is located in the current TSS 520 which is identified by the value in the TR 33. Upon indexing into the IST 550 and selecting the corresponding entry, a new stack pointer is identified which may then be conveyed to the RSP 540. Advantageously, by utilizing the IST mechanism, an unconditional stack switch may be made and a good stack pointer ensured. Consequently, "double fault", "NMI", "Machine Check" and similar problems may be avoided by using the IST stack switch mechanism for interrupts corresponding to those faults.

In the embodiment of FIG. 5, the IST field indicates whether or not the IST mechanism is to be used. In one embodiment, if the IST mechanism is not used, a modified form of the legacy stack switching mechanism may be utilized. In the modified form, when stacks are switched as part of a privilege level change resulting from an interrupt, a new SS descriptor is not loaded. Rather, the modified form only loads an inner-level RSP from the TSS. The new SS selector is forced to null and the SS selector's RPL field is set to the new CPL. The new SS is set to null in order to handle nested far transfers (CALLF, INT, interrupts and exceptions). The old SS and RSP are saved on the new stack. On the subsequent IRET, these are popped from the stack and loaded into the SS and RSP registers, respectively.

The above described IST mechanism may be enabled on an individual interrupt-vector basis via a field in the IDT entry. Thus, some interrupt vectors can use the IST mechanism while others do not. In one embodiment, the IST mechanism is only available in long mode. Further, in one embodiment, when operating in long mode only 64-bit interrupt gates may be referenced. If a reference is made to a 16-bit interrupt or trap gate, a general-protection exception may be generated.

In legacy mode the size of an IDT entry (16 bits or 32 bits) determines the size of interrupt-stack-frame pushes, and the SS:eSP is pushed only on a CPL change. However, because only long-mode gates may be referenced in long mode, the size of the interrupt-stack-frame push is fixed at eight bytes during long mode operation. Long mode also pushes SS:RSP unconditionally, rather than pushing only on a CPL change. Pushing SS:RSP unconditionally presents operating systems with a consistent interrupt-stack-frame across all interrupts.

In addition to the above, in one embodiment IRET semantics may be changed when operating in long mode. In long mode, IRET is executed with an 8-byte operand size. In 64-bit mode, SS:RSP is popped unconditionally. In compatibility and legacy modes, SS:RSP is popped only if the CPL changes. This allows legacy applications to run properly in compatibility mode when using the IRET instruction. Because interrupt-stack-frame pushes are always eight bytes in long mode, an IRET must pop eight byte items off the stack. This may be accomplished by preceding the IRET with a 64-bit operand-size prefix. Further, 64-bit interrupt service routines that exit with an IRET unconditionally pop SS:RSP off of the interrupt stack frame, even if the target code segment is running in 64-bit mode or at CPL=0. This is done because the original interrupt vector always pushes SS:RSP.

Figure 6:
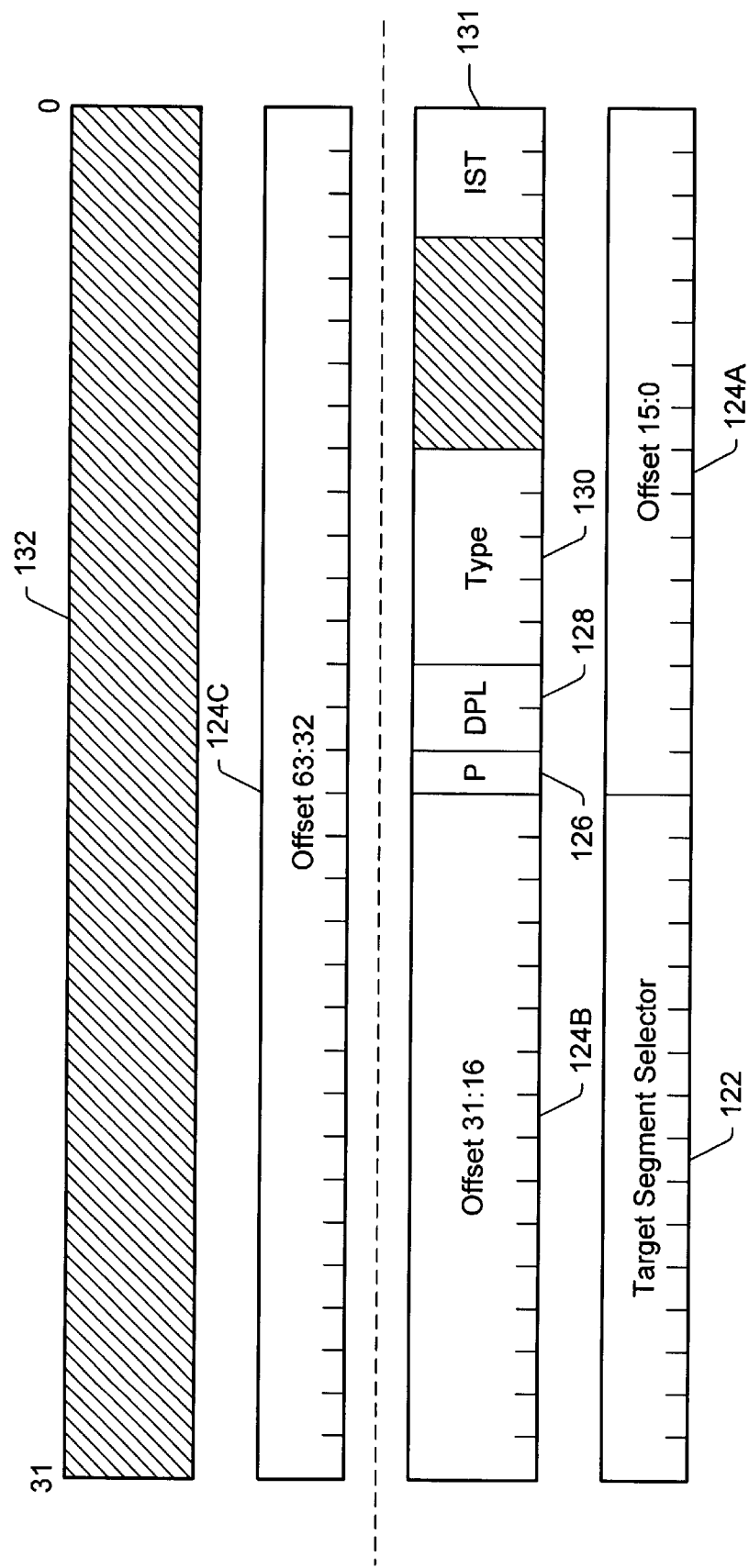
FIG. 6 is a diagram illustrating one embodiment of an interrupt/trap call gate descriptor.

Turning now to FIG. 6, a block diagram of one embodiment of an interrupt/trap gate descriptor 120 is shown. Other embodiments are possible and contemplated. Similar to FIGS. 2 and 3, the most significant bytes are illustrated above the least significant bytes. The most significant bit of each group of four bytes is illustrated as bit 31 and the least significant bit is illustrated as bit 0. Short vertical lines within the four bytes delimit each bit, and the long vertical lines delimit a bit but also delimit a field. As mentioned above, a call gate descriptor occupies two entries in a descriptor table. The horizontal dashed line in FIG. 6 divides call gate descriptor 120 into an upper portion (above the line) and a lower portion (below the line). The lower portion is stored in the entry indexed by the call gate's segment selector, and the upper portion is stored in the next succeeding entry.

Interrupt/trap gate descriptor 120 includes a target segment selector (field 122), an offset (fields 124A, 124B, and 124C), a present (P) bit 126, a descriptor privilege level (DPL) 128, a type field 130, and an IST field 131. The P bit is similar to P bit 48 described above. The target segment selector identifies an entry within one of the descriptor tables at which the target segment descriptor (having the greater privilege level) is stored. The offset identifies the address at which code fetching is to begin. In 32/64 mode, since the code segment has no base address and flat linear addressing is used, the offset is the address at which code fetching begins. In other modes, the offset is added to the segment base defined by the target segment descriptor to generate the address at which code fetching begins. As mentioned above, the offset may comprise 64 bits in the present embodiment.

DPL 128 stores the minimum privilege level of the calling routine must have (both in the current privilege level and the requested privilege level) which may successfully pass through the call gate and execute the called routine at the privilege level specified in the target segment descriptor.

Type field 130 is coded to an interrupt/trap gate type. In one embodiment, this type is coded as a 64 bit gate. Alternatively, other encodings may be used. Finally, IST field 131 is used to store an IST index. In one embodiment, the IST index is 3 bits.

Figure 7:
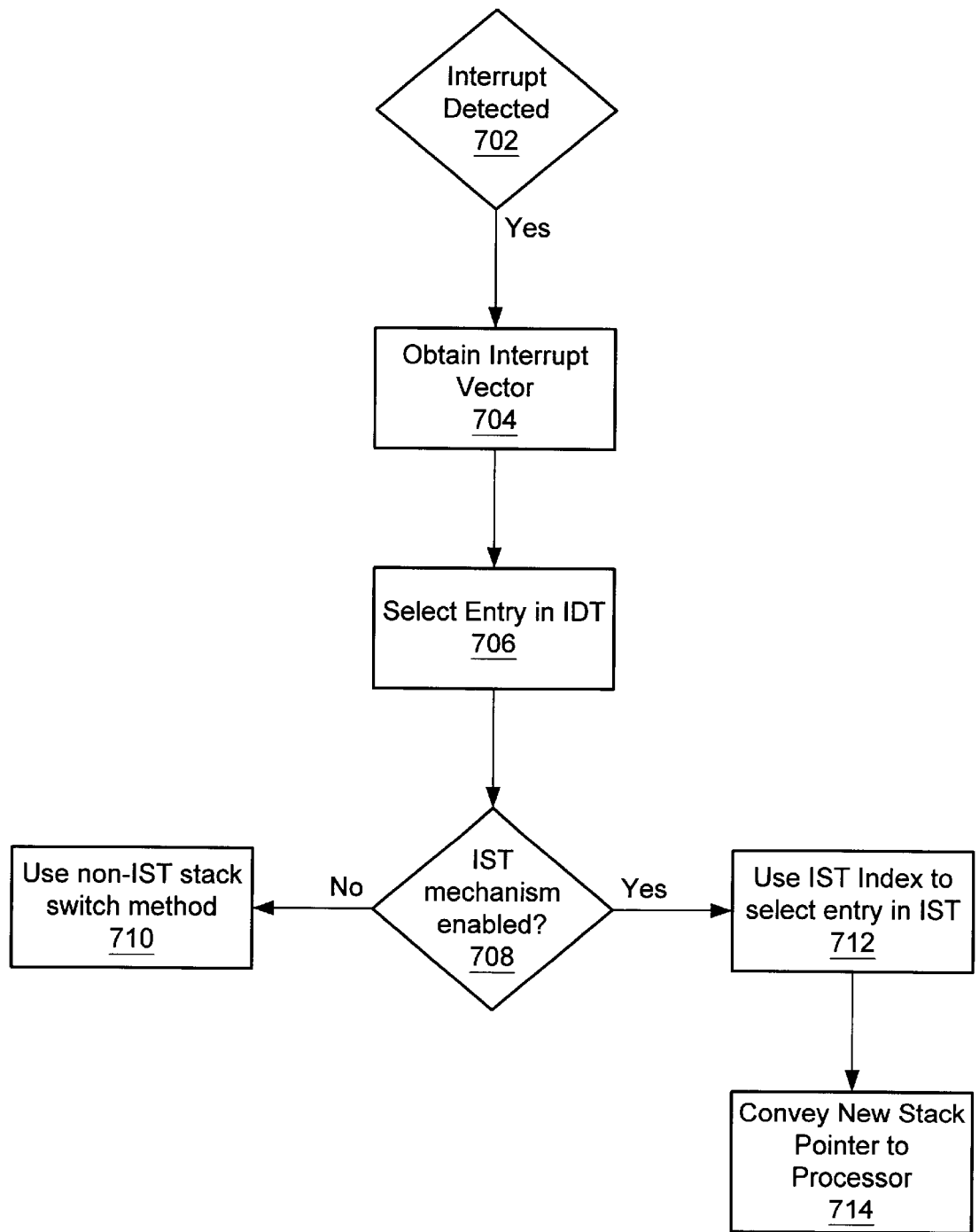
FIG. 7 is a flow diagram showing one embodiment of a stack switch mechanism using an Interrupt Stack Table.

FIG. 7 is a flowchart illustrating one embodiment of the method for utilizing an IST mechanism. Upon detection of an interrupt (step 702), the processor obtains an interrupt vector (step 704). In one embodiment the interrupt vector may be obtained according to standard x86 methods, though other methods may be used. The obtained interrupt vector is then used to index into the IDT (step 706) which is pointed to by the value in the IDTR. After selecting an interrupt/trap gate descriptor entry (step 706) in the IDT, the IST index is obtained. If the IST index is equal to zero (step 708), then the new IST mechanism for stack switching is not used and a non-IST mechanism may be used (e.g., an x86 method such as selecting a new stack based on the Current Privilege Level, or the modified form of the legacy stack switching mechanism described above). On the other hand, if the IST index is not equal to zero (step 708), the IST index is used to select an entry from the IST which is in the current TSS (step 712). Finally, the selected IST entry contains a pointer to a new stack which may then be conveyed to the processor (step 714).

Figure 8:
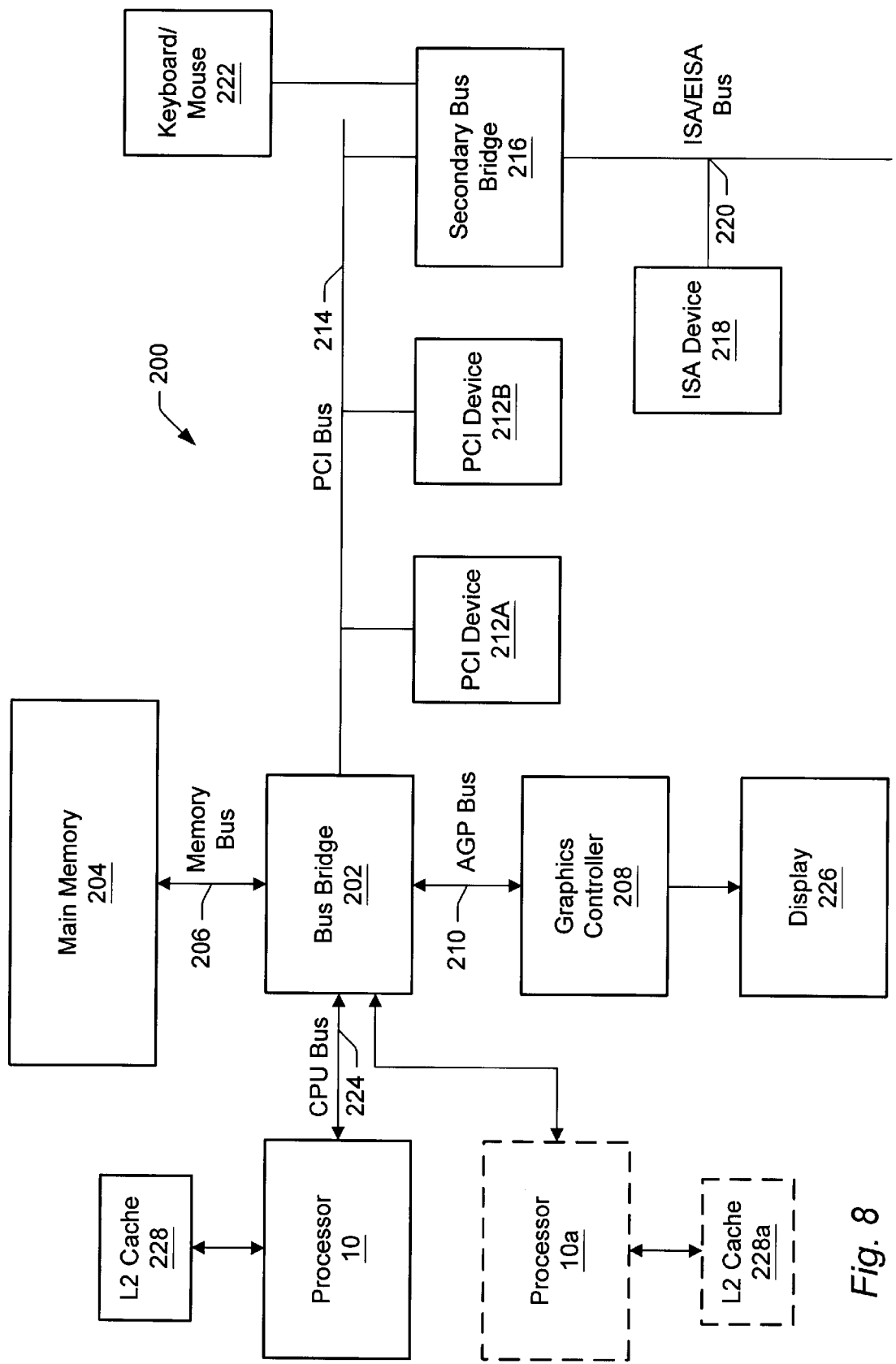
FIG. 8 is a diagram illustrating one embodiment of a computer system including the processor of FIG. 1.

Turning now to FIG. 8, a block diagram of one embodiment of a computer system 200 including processor 10 coupled to a variety of system components through a bus bridge 202 is shown. Other embodiments are possible and contemplated. In the depicted system, a main memory 204 is coupled to bus bridge 202 through a memory bus 206, and a graphics controller 208 is coupled to bus bridge 202 through an AGP bus 210. Finally, a plurality of PCI devices 212A–212B are coupled to bus bridge 202 through a PCI bus 214. A secondary bus bridge 216 may further be provided to accommodate an electrical interface to one or more EISA or ISA devices 218 through an EISA/ISA bus 220. Processor 10 is coupled to bus bridge 202 through a CPU bus 224 and to an optional L2 cache 228. Together, CPU bus 224 and the interface to L2 cache 228 may comprise an external interface to which external interface unit 18 may couple.

Bus bridge 202 provides an interface between processor 10, main memory 204, graphics controller 208, and devices attached to PCI bus 214. When an operation is received from one of the devices connected to bus bridge 202, bus bridge 202 identifies the target of the operation (e.g. a particular device or, in the case of PCI bus 214, that the target is on PCI bus 214). Bus bridge 202 routes the operation to the targeted device. Bus bridge 202 generally translates an operation from the protocol used by the source device or bus to the protocol used by the target device or bus.

In addition to providing an interface to an ISA/EISA bus for PCI bus 214, secondary bus bridge 216 may further incorporate additional functionality, as desired. An input/output controller (not shown), either external from or integrated with secondary bus bridge 216, may also be included within computer system 200 to provide operational support for a keyboard and mouse 222 and for various serial and parallel ports, as desired. An external cache unit (not shown) may further be coupled to CPU bus 224 between processor 10 and bus bridge 202 in other embodiments. Alternatively, the external cache may be coupled to bus bridge 202 and cache control logic for the external cache may be integrated into bus bridge 202. L2 cache 228 is further shown in a backside configuration to processor 10. It is noted that L2 cache 228 may be separate from processor 10, integrated into a cartridge (e.g. slot 1 or slot A) with processor 10, or even integrated onto a semiconductor substrate with processor 10.

Main memory 204 is a memory in which application programs are stored and from which processor 10 primarily executes. A suitable main memory 204 comprises DRAM (Dynamic Random Access Memory). For example, a plurality of banks of SDRAM (Synchronous DRAM) or RAMBUS DRAM (RDRAM) may be suitable.

PCI devices 212A–212B are illustrative of a variety of peripheral devices. The peripheral devices may include devices for communicating with another computer system to which the devices may be coupled (e.g. network interface cards, modems, etc.). Additionally, peripheral devices may include other devices, such as, for example, video accelerators, audio cards, hard or floppy disk drives or drive controllers, SCSI (Small Computer Systems Interface) adapters and telephony cards. Similarly, ISA device 218 is illustrative of various types of peripheral devices, such as a modem, a sound card, and a variety of data acquisition cards such as GPIB or field bus interface cards.

Graphics controller 208 is provided to control the rendering of text and images on a display 226. Graphics controller 208 may embody a typical graphics accelerator generally known in the art to render three-dimensional data structures which can be effectively shifted into and from main memory 204. Graphics controller 208 may therefore be a master of AGP bus 210 in that it can request and receive access to a target interface within bus bridge 202 to thereby obtain access to main memory 204. A dedicated graphics bus accommodates rapid retrieval of data from main memory 204. For certain operations, graphics controller 208 may further be configured to generate PCI protocol transactions on AGP bus 210. The AGP interface of bus bridge 202 may thus include functionality to support both AGP protocol transactions as well as PCI protocol target and initiator transactions. Display 226 is any electronic display upon which an image or text can be presented. A suitable display 226 includes a cathode ray tube ("CRT"), a liquid crystal display ("LCD"), etc.

It is noted that, while the AGP, PCI, and ISA or EISA buses have been used as examples in the above description, any bus architectures may be substituted as desired. It is further noted that computer system 200 may be a multiprocessing computer system including additional processors (e.g. processor 10*a* shown as an optional component of computer system 200). Processor 10*a* may be similar to processor 10. More particularly, processor 10*a* may be an identical copy of processor 10. Processor 10*a* may be connected to bus bridge 202 via an independent bus (as shown in FIG. 17) or may share CPU bus 224 with processor 10. Furthermore, processor 10*a* may be coupled to an optional L2 cache 228*a* similar to L2 cache 228.

Various embodiments may further include receiving, sending or storing instructions and/or data implemented in accordance with the foregoing description upon a carrier medium. Generally speaking, a carrier medium may include transmission media or signals used in broadcast systems and otherwise such as electrical, electromagnetic, or digital signals, conveyed via a communication medium such as network and/or a wireless link. For example, a network operator may convey signals which describe program instructions via a computer network. A carrier medium may also include storage media or memory media such as magnetic or optical media, e.g., disk or CD-ROM, volatile or nonvolatile media such as RAM (e.g. SDRAM, RDRAM, SRAM, etc.), ROM, etc.

Numerous variations and modifications will become apparent to those skilled in the art once the above disclosure is fully appreciated. It is intended that the following claims be interpreted to embrace all such variations and modifications.

What is claimed is:

1. A processor comprising:
   a central processing unit; and
   a memory coupled to said central processing unit, wherein said memory comprises:
      a plurality of stacks;

a task state segment, wherein said task state segment includes an interrupt stack table comprising a plurality of entries corresponding to said plurality of stacks; and an interrupt descriptor table comprising a plurality of descriptors, wherein each of said plurality of descriptors includes an index corresponding to said interrupt stack table.

2. The processor of claim 1, wherein said central processing unit is configured to detect an interrupt, and wherein said processor is configured to select a first descriptor of said plurality of descriptors corresponding to said interrupt.

3. The processor of claim 2, wherein said first descriptor includes an indication of whether an IST mechanism is enabled.

4. The processor of claim 3, wherein said index included in said first descriptor is used to select a stack pointer corresponding to a first stack of said plurality of stacks, in response to detecting said first stack switch mechanism is enabled.

5. The processor of claim 4, wherein said stack pointer is identified by a first entry of said plurality of entries of said first table, and wherein said stack pointer is conveyed to said processing unit.

6. The processor of claim 5, wherein said stack pointer is stored in a stack pointer register (RSP) and the contents of a stack segment (SS) register are not changed.

7. A processor comprising:
a central processing unit; and
a memory coupled to said central processing unit, wherein said memory comprises:
a plurality of stacks;
a first data structure, wherein said first data structure includes a first table comprising a plurality of entries corresponding to said plurality of stacks; and
a second table comprising a plurality of descriptors, wherein each of said plurality of descriptors includes an index corresponding to said first table;
wherein said first data structure is identified by a task register (TR) and said second table is identified by an interrupt descriptor table register (IDTR).

8. A method of stack switching comprising:
selecting a first entry in an Interrupt Descriptor Table;
determining whether an Interrupt Stack Table mechanism is enabled, wherein said determining comprises consulting a first field of said first entry, wherein said first field indicates whether or not said Interrupt Stack Table mechanism is enabled; and
performing an Interrupt Stack Table stack switch in response to detecting said Interrupt Stack Table mechanism is enabled.

9. The method of claim 8, wherein said performing comprises using a contents of said first field to index into a first entry of an Interrupt Stack Table, wherein said first entry of said Interrupt Stack Table indicates a stack pointer, and wherein said stack pointer is conveyed to a central processing unit and stored in a stack pointer register.

10. The method of claim 9, wherein said performing is in further response to detecting a long mode operating mode is activated.

11. A method of stack switching comprising:
selecting a first entry in an Interrupt Descriptor Table;
determining whether an Interrupt Stack Table mechanism is enabled;
performing an Interrupt Stack Table stack switch in response to detecting said Interrupt Stack Table mechanism is enabled; and creating a 64-bit mode Task State Segment, in response to detecting a long mode operating mode is activated, wherein said Interrupt Stack Table is included within said Task State Segment.

12. A method of stack switching comprising:
selecting a first entry in an Interrupt Descriptor Table;
determining whether an Interrupt Stack Table mechanism is enabled;
performing an Interrupt Stack Table stack switch in response to detecting said Interrupt Stack Table mechanism is enabled: and further comprising detecting an interrupt and obtaining an interrupt vector corresponding to said interrupt, prior to said selecting.

13. A carrier medium comprising program instructions, wherein said program instructions are executable to:
select a first entry in an Interrupt Descriptor Table;
determine whether an Interrupt Stack Table mechanism is enabled by consulting a first field of said first entry, wherein said first field indicates whether or not said Interrupt Stack Table mechanism is enabled; and
perform an Interrupt Stack Table stack switch in response to detecting said Interrupt Stack Table mechanism is enabled.

14. The carrier medium of claim 13, wherein said program instructions are configured to perform said stack switch by using a contents of said first field to index into a first entry of an Interrupt Stack Table, wherein said first entry of said Interrupt Stack Table indicates a stack pointer, and wherein said stack pointer is conveyed to a central processing unit and stored in a stack pointer register.

15. The carrier medium of claim 14, wherein said program instructions perform said stack switch in further response to detecting a long mode operating mode is activated.

16. A carrier medium comprising program instructions, wherein said program instructions are executable to:
select a first entry in an Interrupt Descriptor Table;
determine whether an Interrupt Stack Table mechanism is enabled;
perform an Interrupt Stack Table stack switch in response to detecting said Interrupt Stack Table mechanism is enabled;
create a 64-bit mode Task State Segment, in response to detecting a long mode operating mode is activated, wherein said Interrupt Stack Table is included within said Task State Segment.

17. A carrier medium comprising program instructions, wherein said program instructions are executable to:
select a first entry in an Interrupt Descriptor Table;
determine whether an Interrupt Stack Table mechanism is enabled;
perform an Interrupt Stack Table stack switch in response to detecting said Interrupt Stack Table mechanism is enabled; and
detect an interrupt and obtain an interrupt vector corresponding to said interrupt, prior to selecting said first entry.

18. A computer system comprising:
a memory; and
a processor coupled to said memory;
wherein said memory comprises:
a plurality of stacks;
task state segment, wherein said first data structure task state segment includes an interrupt stack table comprising a plurality of entries corresponding to said plurality of stacks, and an interrupt descriptor table comprising a plurality of descriptors, wherein each of said plurality of descriptors includes an index corresponding to said interrupt stack table.

19. The computer system of claim 18, wherein said processor is configured to detect an interrupt, and wherein said processor is configured to select a first descriptor of said plurality of descriptors corresponding to said interrupt.

20. The computer system of claim 19, wherein said first descriptor includes an indication of whether an IST mechanism is enabled.

21. The computer system of claim 20, wherein said index included in said first descriptor is used to select a stack pointer corresponding to a first stack of said plurality of stacks, in response to detecting said first stack switch mechanism is enabled.

22. The computer system of claim 21, wherein said stack pointer is identified by a first entry of said plurality of entries of said first table, and wherein said stack pointer is conveyed to said processing unit.

23. The computer system of claim 22, wherein said stack pointer is stored in a stack pointer register (RSP) and the contents of a stack segment (SS) register are not changed.

24. A computer system comprising:

a memory; and a processor coupled to said memory;

wherein said memory comprises:
　a plurality of stacks;
　a first data structure, wherein said first data structure includes a first table comprising a plurality of entries corresponding to said plurality of stacks; and
　a second table comprising a plurality of descriptors, wherein each of said plurality of descriptors includes an index corresponding to said first table;

wherein said first data structure is identified by a task register (TR) and said second table is identified by an interrupt descriptor table register (IDTR).

* * * * *